US009621092B2

(12) United States Patent
Oono

(10) Patent No.: US 9,621,092 B2
(45) Date of Patent: Apr. 11, 2017

(54) INDUCTION MOTOR CONTROL APPARATUS AND INDUCTION MOTOR CONTROL METHOD

(71) Applicant: NISSAN MOTOR CO., LTD., Yokohama-shi, Kanagawa (JP)

(72) Inventor: Sho Oono, Isehara (JP)

(73) Assignee: NISSAN MOTOR CO., LTD., Yokohama-shi (JP)

(*) Notice: Subject to any disclaimer, the term of this patent is extended or adjusted under 35 U.S.C. 154(b) by 0 days.

(21) Appl. No.: 14/761,145

(22) PCT Filed: Jan. 16, 2014

(86) PCT No.: PCT/JP2014/050627
§ 371 (c)(1),
(2) Date: Jul. 15, 2015

(87) PCT Pub. No.: WO2014/115626
PCT Pub. Date: Jul. 31, 2014

(65) Prior Publication Data
US 2015/0372628 A1   Dec. 24, 2015

(30) Foreign Application Priority Data

Jan. 25, 2013 (JP) ................................. 2013-012535

(51) Int. Cl.
*H02P 27/04* (2016.01)
*H02P 21/14* (2016.01)
(Continued)

(52) U.S. Cl.
CPC ........ *H02P 21/141* (2013.01); *B60L 11/1803* (2013.01); *B60L 15/025* (2013.01);
(Continued)

(58) Field of Classification Search
CPC ...... H02P 21/141; H02P 21/14; H02P 21/145; H02P 2207/076; H02P 27/06; H02P 1/029;
(Continued)

(56) References Cited

U.S. PATENT DOCUMENTS 5,650,700 A * 7/1997 Mutoh ................... B60L 15/025
318/432
6,163,912 A * 12/2000 Matsuura ................ D06F 7/203
68/12.16

(Continued)

FOREIGN PATENT DOCUMENTS

JP    2000-308400 A   11/2000
JP    2001-045613 A    2/2001
JP    2005-269835 A    9/2005

*Primary Examiner* — Paul Ip
(74) *Attorney, Agent, or Firm* — Foley & Lardner LLP

(57) ABSTRACT

An induction motor control apparatus controls an induction motor connected to drive wheels by setting a motor torque command value on the basis of vehicle information. The induction motor control apparatus calculates a first torque current command value and a first excitation current command value on the basis of the motor torque command value and estimates a rotor magnetic flux on the basis of the first excitation current command value. The induction motor control apparatus calculates a first torque command value on the basis of an estimated value of the rotor magnetic flux and the first torque current command value. Further the induction motor control apparatus calculates a second torque command value by applying filter processing to the first torque command value, a natural vibration frequency component of a drive shaft torque transmission system in a vehicle being removed in the filter processing. Then the induction motor control apparatus controls drive of the induction motor on the basis of the first excitation current command value and the second torque current command value.

5 Claims, 14 Drawing Sheets

(51) Int. Cl.
*B60L 15/20* (2006.01)
*B60L 15/02* (2006.01)
*H02P 21/05* (2006.01)
*B60L 11/18* (2006.01)

(52) U.S. Cl.
CPC .............. *B60L 15/20* (2013.01); *H02P 21/05* (2013.01); *B60L 2210/40* (2013.01); *B60L 2220/12* (2013.01); *B60L 2240/12* (2013.01); *B60L 2240/14* (2013.01); *B60L 2240/421* (2013.01); *B60L 2240/423* (2013.01); *B60L 2240/427* (2013.01); *B60L 2240/429* (2013.01); *B60L 2240/527* (2013.01); *B60L 2240/529* (2013.01); *B60L 2240/80* (2013.01); *B60L 2250/28* (2013.01); *B60L 2260/24* (2013.01); *B60L 2260/26* (2013.01); *B60L 2260/44* (2013.01); *B60L 2270/145* (2013.01); *Y02T 10/643* (2013.01); *Y02T 10/7005* (2013.01); *Y02T 10/7241* (2013.01); *Y02T 10/7275* (2013.01)

(58) Field of Classification Search
CPC ........ H02P 1/26; H02P 21/0089; H02P 21/04; H02P 21/34; H02P 2207/01; H02P 29/0066; H02P 6/182; B60L 15/025
USPC .................................. 318/801, 400.02, 807
See application file for complete search history.

(56) References Cited

U.S. PATENT DOCUMENTS

| | | | |
|---|---|---|---|
| 6,275,000 B1* | 8/2001 | Nishimura | H02P 21/34 318/801 |
| 6,315,081 B1* | 11/2001 | Yeo | B66B 5/02 187/290 |
| 7,852,039 B2* | 12/2010 | Kinpara | H02P 21/14 318/720 |
| 2007/0018606 A1* | 1/2007 | Iura | H02P 21/141 318/807 |
| 2008/0007198 A1* | 1/2008 | Kinpara | H02P 21/14 318/807 |
| 2008/0297097 A1* | 12/2008 | Lee | H02P 21/141 318/701 |
| 2009/0237014 A1* | 9/2009 | Yamada | H02P 21/145 318/400.02 |
| 2011/0204831 A1* | 8/2011 | Iwaji | B60L 15/025 318/244 |
| 2012/0001587 A1* | 1/2012 | Kono | 318/801 |
| 2013/0093370 A1* | 4/2013 | Yoo | H02P 21/145 318/400.02 |
| 2013/0184918 A1* | 7/2013 | Motosugi | B60L 15/20 701/22 |
| 2013/0249448 A1* | 9/2013 | Kobayashi | H02P 21/141 318/400.02 |

* cited by examiner

INDUCTION MOTOR CONTROL APPARATUS AND INDUCTION MOTOR CONTROL METHOD

TECHNICAL FIELD

The present invention relates to a control apparatus and a control method of an induction motor.

BACKGROUND ART

An induction motor vector control for controlling a motor torque by adjusting a magnetic flux current and a torque current obtained by converting a three-phase alternating current caused to flow into a stator of an induction motor into currents in an orthogonal two-axis coordinate system synchronized with a power source angular frequency (=motor electric angular frequency+slip angular frequency) is disclosed on pages 72-98 of "Actual Theory and Design of AC Servo Systems" by Hidehiko Sugimoto, Masato Koyama and Shinzo Tamai. In the case of controlling the slip angular frequency in proportion to a ratio of the torque current and a rotor magnetic flux, an induction motor torque is proportional to the product of the rotor magnetic flux generated with a delay in response to an excitation current and the orthogonal torque current.

A vibration damping control apparatus for the synchronous motor described in JP2001-45613A calculates a drive torque target value (T1*) by filtering a drive torque request value (T*) through a vibration damping filter for suppressing the torsional vibration of a drive shaft of a vehicle. In this synchronous motor, a rotor magnetic flux is constantly generated by a permanent magnet provided in a rotor, and an output torque of a synchronous motor proportional to the product of the rotor magnetic flux, which is a fixed value, and a torque current becomes a linear response value and coincides with the above drive torque target value (T1*).

However, in the case of simply applying the vibration damping filter described in JP2001-45613A to a control system for an induction motor, the following problem occurs. Specifically, although the drive torque target value obtained by applying the vibration damping filter to the drive torque request value is a target value capable of reducing torsional vibration, it does not coincide with the drive torque target value. This is because an output torque of the motor is a nonlinear response value due to a delay of the rotor magnetic flux in the induction motor. Thus, the torsional vibration of the drive shaft cannot be suppressed.

The present invention aims to provide an induction motor control apparatus capable of suppressing the torsional vibration of a drive shaft.

According the present invention, an induction motor control apparatus controls an induction motor connected to drive wheels by setting a motor torque command value on the basis of vehicle information. The induction motor control apparatus calculates a first torque current command value and a first excitation current command value on the basis of the motor torque command value and estimates a rotor magnetic flux on the basis of the first excitation current command value. The induction motor control apparatus calculates a first torque command value on the basis of an estimated value of the rotor magnetic flux and the first torque current command value. The induction motor control apparatus calculates a second torque command value by applying filter processing to the first torque command value, a natural vibration frequency component of a drive shaft torque transmission system in a vehicle being removed in the filter processing. Then the induction motor control apparatus controls drive of the induction motor on the basis of the first excitation current command value and the second torque current command value.

Embodiments of the present invention are described in detail below with reference to the accompanying drawings.

DESCRIPTION OF EMBODIMENTS

First Embodiment

Figure 1:
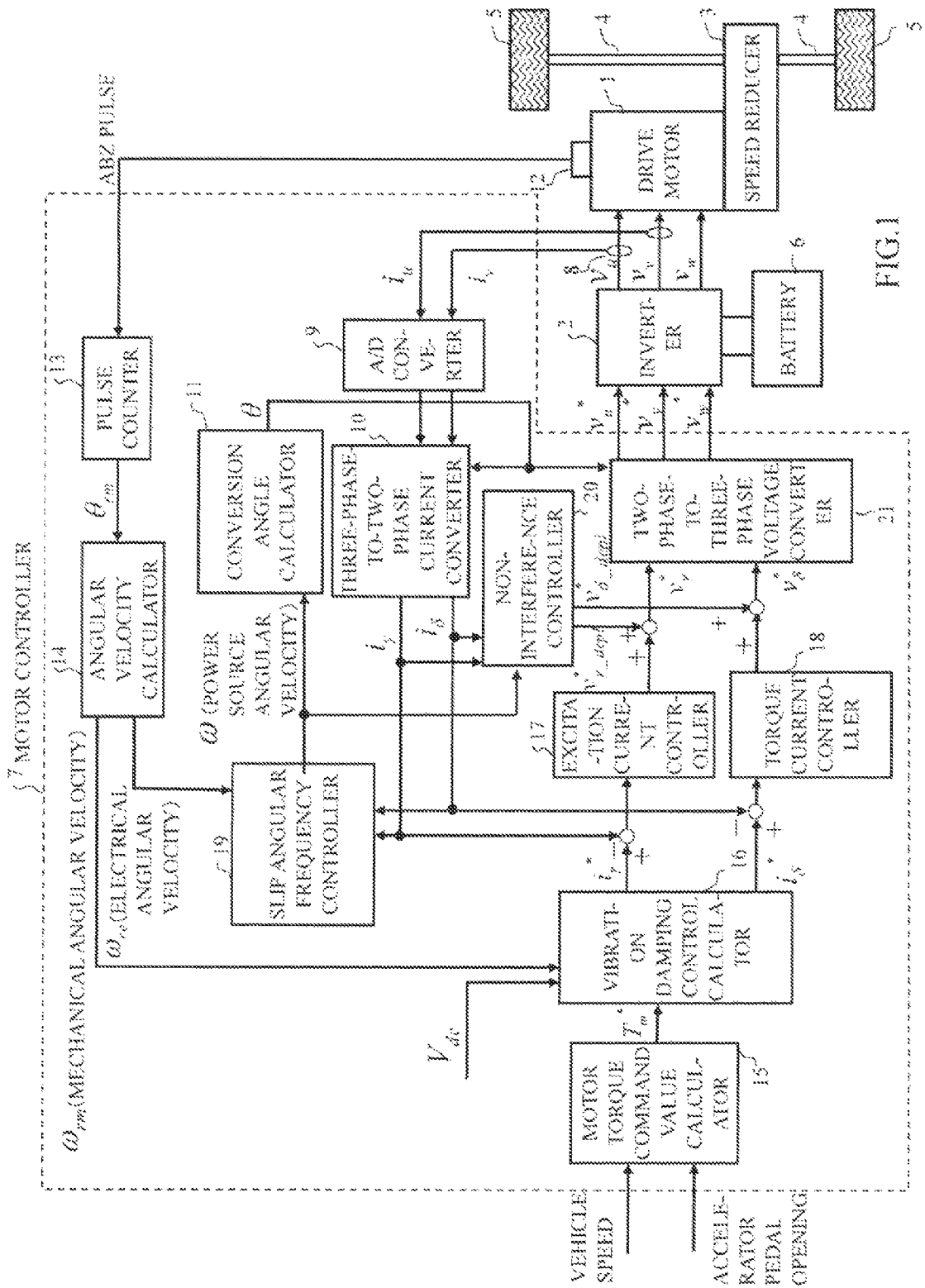
FIG. 1 is a block diagram showing a configuration of an induction motor control apparatus in a first embodiment.

FIG. 1 is a block diagram showing a configuration of an induction motor control apparatus in a first embodiment. This induction motor control apparatus is, for example, applied to an electric vehicle. A configuration example applied to an electric vehicle is shown in FIG. 1. It should be noted that application to vehicles other than electric vehicles, such as hybrid vehicles and fuel cell vehicles, is also possible.

A motor controller 7 receives signals of various vehicle variables such as a vehicle speed, an accelerator pedal opening, a rotor position signal and a current flowing in a drive motor 1 in the form of digital signals as inputs. A motor controller 7 generates a PWM signal for controlling the drive motor 1 in accordance with various vehicle variables and generates a drive signal for an inverter 2 through a drive circuit in accordance with this PWM signal.

The inverter 2 includes two pairs of switching elements (power semiconductor elements such as IGBTs and MOSFETs) for each phase. The inverter 2 converts a direct current supplied from a battery 6 into alternating currents $v_u$, $v_v$ and $v_w$ and supplies them to the drive motor 1 by turning on and off the switching elements in accordance with the drive signal generated by the motor controller 7.

The drive motor 1 is a three-phase alternating current induction motor. The drive motor 1 generates a drive force by the alternating currents supplied from the inverter 2 and transmits the drive force to left and right drive wheels 5 via a speed reducer 3 and a drive shaft 4. Further, when rotating, following the rotation of the drive wheels 5 when the vehicle is traveling, the drive motor 1 generates a regenerative drive force, thereby collecting kinetic energy of the vehicle as electrical energy. In this case, the inverter 2 converts an alternating current generated during the regenerative operation of the drive motor 1 into a direct current and supplies it to the battery 6.

The detailed operation of the motor controller 7 will be described.

A current sensor 8 detects currents of at least two phases (e.g. U-phase current $i_u$, V-phase current $i_v$) out of the three-phase alternating current. The detected currents $i_u$, $i_v$ of two phases are converted into digital signals in an A/D converter 9 and are input to a three-phase-to-two-phase current converter 10. It should be noted that the current $i_w$ of the remaining phase can be obtained by the following equation (1) in the case of mounting the current sensor 8 only for two phases.

[Equation 1]

$$i_w = -i_u - i_v \quad (1)$$

The three-phase-to-two-phase current converter 10 carries out conversion from a three-phase alternating current coordinate system (uvw axes) to a later-described orthogonal two-axis direct current coordinate system ($\gamma$-$\delta$ axes) rotating at a power source angular velocity $\omega$. Specifically, the u-phase current $i_u$, the v-phase current $i_v$, the w-phase current $i_w$ and a power source angle $\theta$ obtained by a conversion angle calculator 11 are input and a $\gamma$-axis current (excitation current) $i_\gamma$ and a $\delta$-axis current (torque current) $i_\delta$ are calculated by the following equation (2). The power source angle $\theta$ is obtained by integrating the power source velocity $\omega$.

[Equation 2]

$$\begin{bmatrix} I_\gamma \\ I_\delta \end{bmatrix} = \sqrt{\frac{2}{3}} \begin{bmatrix} \cos\theta & \sin\theta \\ -\sin\theta & \cos\theta \end{bmatrix} \begin{bmatrix} 1 & -\frac{1}{2} & -\frac{1}{2} \\ 0 & \frac{\sqrt{3}}{2} & \frac{\sqrt{3}}{2} \end{bmatrix} \begin{bmatrix} I_u \\ I_v \\ I_w \end{bmatrix} \quad (2)$$

A magnetic pole position detector 12 outputs A-phase, B-phase and Z-phase pulses corresponding to a rotor position (angle) of the drive motor 1. A pulse counter 13 receives the A-phase, B-phase and Z-phase pulses as inputs and outputs a rotor mechanical angle $\theta_{rm}$. An angular velocity calculator 14 receives the rotor mechanical angle $\theta_{rm}$ as an input and obtains a rotor mechanical angular velocity $\omega_{rm}$ and a rotor electrical angular velocity $\omega_{re}$ calculated by multiplying the rotor mechanical angular velocity $\omega_{rm}$ by a motor pole pair number p on the basis of a time change rate of the rotor mechanical angle $\theta_{rm}$.

Figure 2:
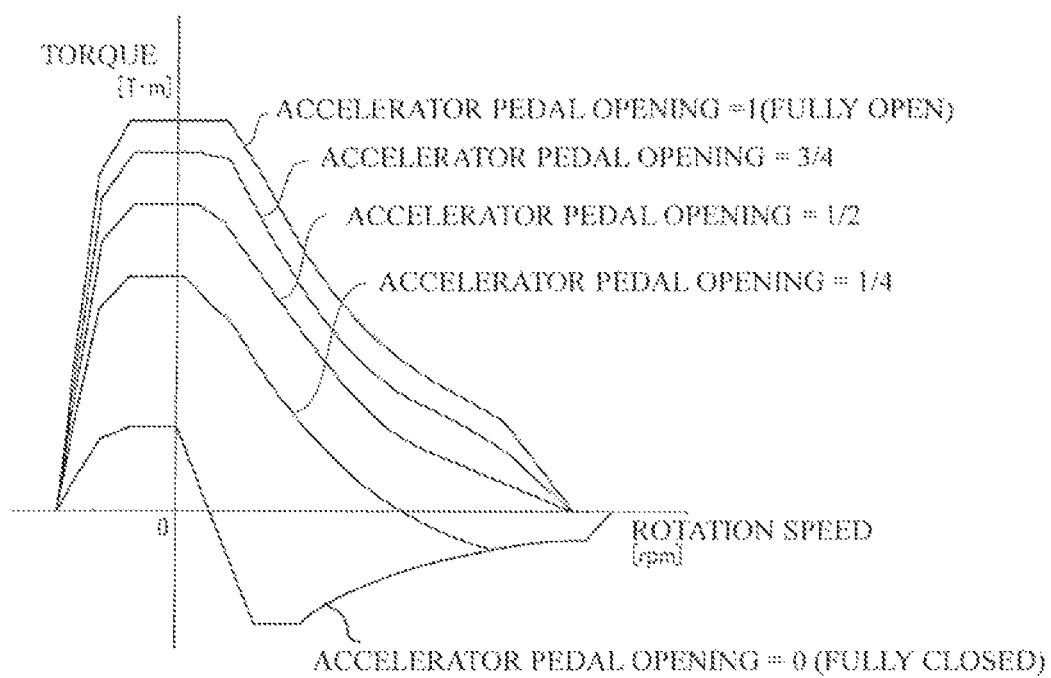
FIG. 2 is an accelerator pedal opening-torque table.

A motor torque command value calculator 15 calculates a motor torque command value $T_m^*$ by referring to an accelerator pedal opening-torque table shown in FIG. 2 on the basis of an accelerator pedal opening APO and a vehicle speed V.

The vehicle speed V (km/h) is obtained by an unillustrated vehicle speed sensor or obtained via communication from another controller such as an unillustrated brake controller. Alternatively, a vehicle speed v (m/s) is calculated by dividing the product of the rotor mechanical angular velocity $\omega_{rm}$ and a tire movement radius R by a gear ratio of a final gear and the vehicle speed V (km/h) is calculated through unit conversion by multiplying the vehicle speed v by 3600/1000.

The accelerator pedal opening APO (%) is obtained from an unillustrated accelerator pedal opening sensor or obtained via communication from another controller such as an unillustrated vehicle controller.

A vibration damping control calculator 16 receives the motor torque command value $T_m^*$, the rotor mechanical angular velocity $\omega_{rm}$ and a direct current voltage value $V_{dc}$ as inputs and calculates a $\gamma$-axis current command value (excitation current command value) $i_\gamma^*$ and a $\delta$-axis current command value (torque current command value) $i_\delta^*$ for suppressing drive force transmission system vibration (torsional vibration of the drive shaft 4) without sacrificing a response of a drive shaft torque. How to calculate the $\gamma$-axis current command value (excitation current command value) $i_\gamma^*$ and the $\delta$-axis current command value (torque current command value) $i_\delta^*$ is described later.

The direct current voltage value $V_{dc}$ (V) is obtained by a voltage sensor (not shown) provided in a direct current power line between the battery 6 and the inverter 2, or from a power source voltage value transmitted from an unillustrated battery controller.

An excitation current controller 17 and a torque current controller 18 each obtain a voltage command value for causing the measured $\gamma$-axis current (excitation current) $i_\gamma$ and $\delta$-axis current (torque current) $i_\delta$ to respectively follow the $\gamma$-axis current command value (excitation current command value) $i_\gamma^*$ and the $\delta$-axis current command value (torque current command value) $i_\delta^*$ with desired responsiveness without steady deviation. Normally, if a control to cancel out an interference voltage between $\gamma$-$\delta$ orthogonal coordinate axes by a non-interference controller 20 functions ideally, a simple 1-input/1-output control target characteristic is obtained. Thus, it is realizable by a simple PI feedback compensator. Values obtained by correcting (adding) the current command values, which are outputs of the excitation current controller 17 and the torque current controller 18, using non-interference voltages $V_\gamma^*_{\#dept}$, $V_\delta^*_{\#dept}$, which are outputs of the non-interference controller 20, are set as a $\gamma$-axis voltage command value (excitation voltage command value) $V_\gamma^*$ and a $\delta$-axis voltage command value (torque voltage command value) $V_\delta^*$.

A slip angular frequency controller 19 receives the $\gamma$-axis current (excitation current) $i_\gamma$ and the $\delta$-axis current (torque current) $i_\delta$ as inputs and calculates a slip angular velocity $\Omega_{se}$ by the following equations (3) and (4). M, $R_r$, and $L_r$ are parameters of the induction motor and respectively denote a mutual inductance, a rotor resistance and a rotor self-inductance. $\tau_\phi$ denotes a response time constant of a rotor magnetic flux and s denotes a Laplace operator.

[Equation 3]

$$\omega_{se} = \frac{M \cdot R_\gamma}{L_\gamma} \cdot \frac{I_\delta}{\phi_\gamma} \quad (3)$$

[Equation 4]

$$\phi_\gamma = \frac{M}{\tau_\phi \cdot s + 1} \cdot i_\gamma \quad (4)$$

A value obtained by adding the slip angular velocity $\omega_{se}$ to the rotor electrical angular velocity $\omega_{re}$ is set as the power source angular velocity $\omega$. By executing this slip angular frequency control, the induction motor torque becomes proportional to the product of the γ-axis current (excitation current) $i_\gamma$ and the δ-axis current (torque current) $i_\delta$.

The non-interference controller 20 receives the measured γ-axis current (excitation current) $i_\gamma$ and δ-axis current (torque current) $i_\delta$ and the power source angular velocity to as inputs and calculates the non-interference voltages $V_\gamma^*{}_{\#dept}$, $V_\delta^*{}_{\#dept}$ necessary to cancel out the interference voltages between the γ-δ orthogonal coordinate axes by the following equations (5). σ and $L_s$ are parameters of the induction motor and respectively denote a leakage coefficient and a self-inductance of a stator.

[Equations 5]

$$V_{\gamma\_dcpl} = -\omega \cdot \sigma \cdot L_s \cdot i_\delta \quad (5)$$

$$V_{S\_dcpl} = -\omega \cdot \left( \sigma \cdot L_s \cdot i_\gamma + \frac{M}{L_\gamma} \phi_\gamma \right)$$

A two-phase-to-three-phase voltage converter 21 carries out conversion from the orthogonal two-axis direct current coordinate system (γ-δ axes) rotating at the power source angular velocity ω into the three-phase alternating current coordinate system (uvw axes). Specifically, the γ-axis voltage command value (excitation voltage command value) $V_\gamma^*$, the δ-axis voltage command value (torque voltage command value) $V_\delta^*$ and the power source angle θ obtained by integrating the power source angular velocity ω are input and voltage command values $V_u^*$, $V_v^*$ and $V_w^*$ of the respective U-, V- and W-phases are calculated by coordinate conversion processing by the following equation (6) and output.

[Equation 6]

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_\gamma^* \\ v_\delta^* \end{bmatrix} \quad (6)$$

Here, a motor torque $T_m$ is expressed by the following equation (7).

[Equation 7]

$$T_m = K_T \cdot \phi_\gamma \cdot i_\delta \quad (7)$$

$\phi_\gamma$, $i_\gamma$, and $i_\delta$ are respectively expressed by the following equations (8) to (10).

[Equation 8]

$$\phi_\gamma = \frac{M}{\tau_\phi \cdot s + 1} \cdot i_\gamma \quad (8)$$

[Equation 9]

$$i_\gamma = \frac{1}{\tau_\gamma \cdot s + 1} \cdot i_\gamma^* \quad (9)$$

[Equation 10]

$$i_\delta = \frac{1}{\tau_\delta \cdot s + 1} \cdot i_\delta^* \quad (10)$$

$K_T$ in the equation (7) denotes a coefficient determined by the parameters of the induction motor. $\tau_\phi$, $\tau_\gamma$ and $\tau_\delta$ in the equations (8) to (10) respectively denote a response time constant of the rotor magnetic flux, a response time constant of the γ-axis current and a response time constant of the δ-axis current.

Figure 3:
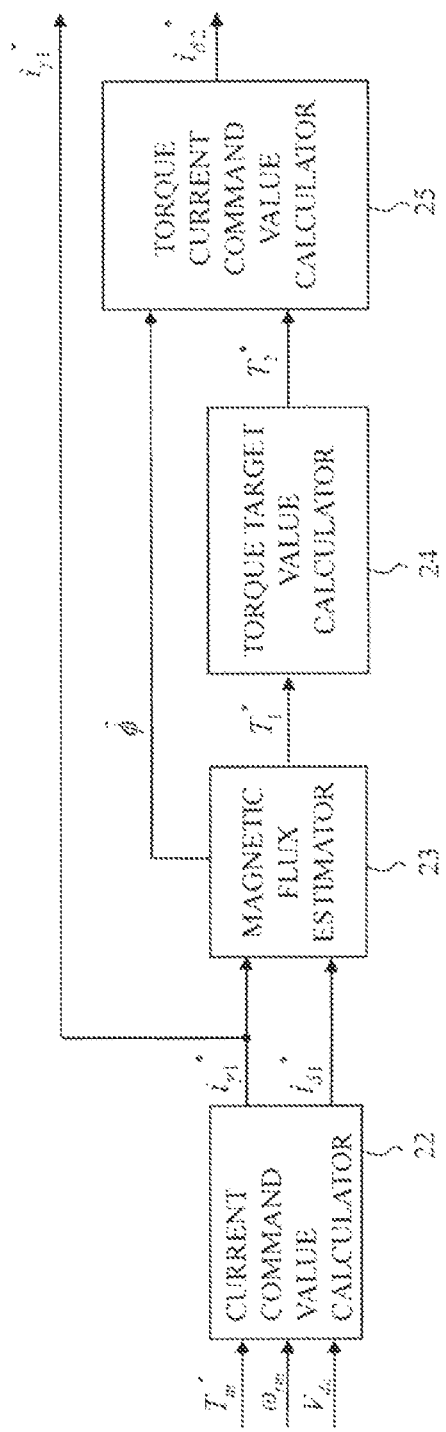
FIG. 3 is a block diagram showing a detailed configuration of a vibration damping control calculator.

FIG. 3 is a block diagram showing a detailed configuration of the vibration damping control calculator 16. The vibration damping control calculator 16 includes a current command value calculator 22, a magnetic flux estimator 23, a torque target value calculator 24 and a torque current command value calculator 25. The vibration damping control calculator 16 outputs a γ-axis current command value $i_{\gamma 1}^*$ calculated by the current command value calculator 22 and a δ-axis current command value $i_{\delta 2}^*$ calculated by the torque current command value calculator 25 respectively as the γ-axis current command value (excitation current command value) $i_\gamma^*$ and the δ-axis current command value (torque current command value) $i_\delta^*$.

The current command value calculator 22 receives the motor torque command value $T_m^*$, the rotor mechanical angular velocity $\omega_{rm}$ and the direct current voltage value $V_{dc}$ as inputs and calculates a first γ-axis current command value $i_{\gamma 1}^*$ and a first δ-axis current command value $i_{\delta 1}^*$. The first γ-axis current command value $i_{\gamma 1}^*$ and the first δ-axis current command value $i_{\delta 1}^*$ can be obtained by referring to map data defining a relationship of a target motor torque, a motor rotation speed (mechanical angular velocity $\omega_{rm}$), the direct current voltage $V_{dc}$, the γ-axis current command value and the δ-axis current command value stored in a memory in advance.

Figure 4:
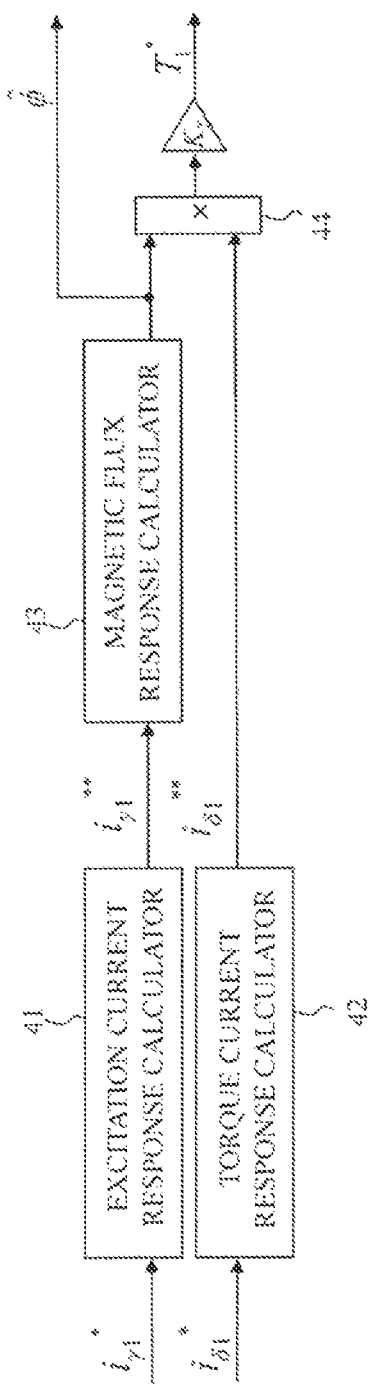
FIG. 4 is a block diagram showing a detailed configuration of a magnetic flux estimator.

FIG. 4 is a block diagram showing a detailed configuration of the magnetic flux estimator 23. The magnetic flux estimator 23 includes an excitation current response calculator 41, a torque current response calculator 42, a magnetic flux response calculator 43 and a multiplier 44.

A first torque command value $T_1^*$ and a rotor magnetic flux estimated value $\hat{\phi}$ are respectively calculated by the following equations (11), (12).

[Equation 11]

$$T_1^* = K_T \hat{\phi} \cdot i_{\delta 1}^{**} \quad (11)$$

[Equation 12]

$$\hat{\phi} = \frac{M}{\tau_\phi \cdot s + 1} \cdot i_{\gamma 1}{}^{**} \quad (12)$$

Further, $i_{\delta 1}{}^{}$ in the equation (11) and $i_{\gamma 1}{}^{}$ in the equation (12) are respectively calculated by equations (13), (14).

[Equation 13]

$$i_{\gamma 1}{}^{**} = \frac{1}{\tau_\gamma \cdot s + 1} \cdot i_{\gamma 1}{}^* \quad (13)$$

[Equation 14]

$$i_{\delta 1}{}^{**} = \frac{1}{\tau_\delta \cdot s + 1} \cdot i_{\delta 1}{}^* \quad (14)$$

$K_T$ in the equation (11) is a coefficient determined by the parameters of the induction motor and $\tau_\phi$, $\tau_\gamma$, and $\tau_\delta$ in the equations (12) to (14) are the response time constant of the rotor magnetic flux, the response time constant of the γ-axis current and the response time constant of the δ-axis current.

The excitation current response calculator 41 calculates a second γ-axis current command value $i_{\gamma 1}{}^{}$ by the equation (13) and the torque current response calculator 42 calculates a second δ-axis current command value $i_{\gamma 1}{}^{}$ by the equation (14). The magnetic flux response calculator 43 calculates a rotor magnetic flux estimated value $\hat{\phi}$ by the equation (12). The first torque command value $T_1{}^*$ is obtained by multiplying the product of the rotor magnetic flux estimated value $\hat{\phi}$ and the second δ-axis current command value $i_{\delta 1}{}^{}$ by $K_T$ by the multiplier 44** as shown in the equation (11).

The torque target value calculator 24 shown in FIG. 3 calculates a second torque command value $T_2{}^*$ by applying a filter processing of removing a natural vibration frequency component of a drive shaft torque transmission system of the vehicle to the first torque command value $T_1{}^*$ (see equation (15)).

[Equation 15]

$$T_2{}^* = G_{INV}(s) \cdot T_3{}^* \quad (15)$$

Figure 5:
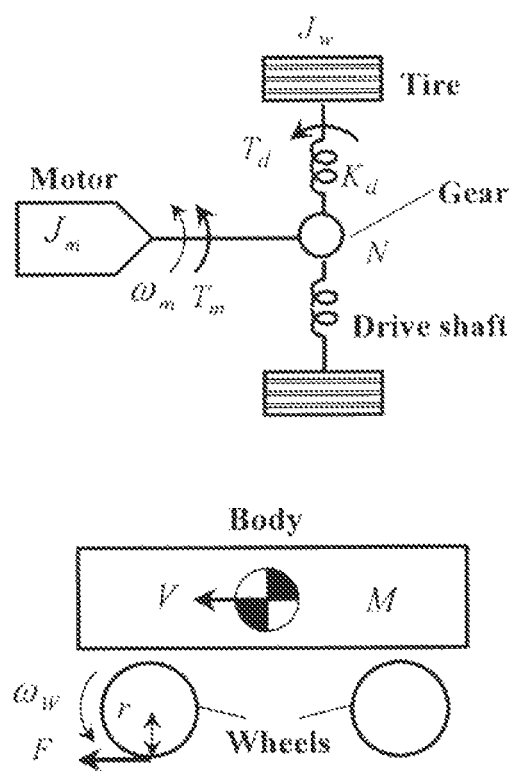
FIG. 5 is a diagram modeling a drive shaft torque transmission system of a vehicle.

How to derive a filter $G_{INV}(s)$ for removing the natural vibration frequency component of the drive shaft torque transmission system of the vehicle will be described. FIG. 5 is a diagram modeling the drive shaft torque transmission system of the vehicle, and a motion equation of the vehicle is expressed by the following equations (16) to (20).

[Equation 16]

$$J_m \cdot \dot{\omega}_m = T_m - T_d/N \quad (16)$$

[Equation 17]

$$2 J_w \cdot \dot{\omega}_m = T_d - rF \quad (17)$$

[Equation 18]

$$M \cdot \dot{V} = F \quad (18)$$

[Equation 19]

$$T_d = K_d \int \left( \frac{\omega_m}{N_{al}} - \omega_w \right) dt \quad (19)$$

[Equation 20]

$$F = K_t(r\omega_m - V) \quad (20)$$

Here, each parameter is as follows.
$J_m$: motor inertia
$J_w$: drive shaft inertia (for one axis)
$K_d$: torsional rigidity of drive shaft
$K_t$: coefficient relating to friction between tires and road surface
$N_{al}$: overall gear ratio
r: tire load radius
$\omega_m$: motor angular velocity
$\omega_w$: drive wheel angular velocity
$T_m$: motor torque
$T_d$: drive shaft torque
F: drive force (for two axes)
V: vehicle speed When a transmission characteristic $G_p(s)$ from the motor torque command value $T_m$ to the motor angular velocity $\omega_m$ is obtained by Laplace-transforming the equations (16) to (20), equations (21), (22) are obtained.

[Equation 21]

$$\omega_m = G_p(s) \cdot T_m \quad (21)$$

[Equation 22]

$$G_p(s) = \frac{1}{s} \cdot \frac{b_3 s^3 + b_2 s^2 + b_1 s + b_0}{a_3 s^3 + a_2 s^2 + a_1 s + a_0} \quad (22)$$

Parameters $a_3$ to $a_0$, $b_3$ to $b_0$ in the equation (22) are expressed by the following equations (23).

[Equations 23]

$$a_3 = 2 J_m J_w M$$

$$a_2 = K_t J_m (2 J_w + r^2 M)$$

$$a_1 = K_d M (J_m + 2 J_w/N^2)$$

$$a_0 = K_d K_t (J_m + 2 J_w/N_2 + r^2 M/N^2)$$

$$b_3 = 2 J_w M$$

$$b_2 = K_t(2 J_w + r^2 M)$$

$$b_1 = K_d M$$

$$b_0 = K_d K_t$$

The equation (22) is arranged into the following equation (24). $\zeta_p$ and $\omega_p$ in the equation (24) respectively denote a damping coefficient and a natural vibration frequency of a drive torsional vibration system.

[Equation 24]

$$G_p(s) = \frac{1}{s} \cdot \frac{(s+\beta) \cdot (b'_2 s^2 + b'_1 s + b'_0)}{(s+\alpha) \cdot (s^2 + 2\zeta_p \omega_p s + \omega_p^2)} \quad (24)$$

Next, an ideal model $G_m(s)$ indicating a response target of the motor rotating speed in relation to a torque input to the vehicle and a transmission function $G_{INV}(s)$ are described. When the ideal model $G_m(s)$ is expressed by equation (25), $G_{INV}(s)$ is expressed by equation (26). $\zeta_m$ and $\omega_m$ in the equations denote a damping coefficient and a natural vibration frequency of the ideal model.

[Equation 25]

$$G_m(s) = \frac{1}{s} \cdot \frac{(s+\beta) \cdot (b'_2 s^2 + b'_1 s + b'_0)}{(s+\alpha) \cdot (s^2 + 2\zeta_m \omega_m s + \omega_m^2)} \quad (25)$$

[Equation 26]

$$G_{INV}(s) = \frac{G_m(s)}{G_p(s)} \cdot \frac{s^2 + 2\zeta_p \omega_p s + \omega_p^2}{s^2 + 2\zeta_m \omega_m s + \omega_m^2} \quad (26)$$

The torque current command value calculator 25 in FIG. 3 receives the second torque command value $T_2^*$ and the rotor magnetic flux estimated value $\hat{\phi}$ as inputs and calculates the &-axis current command value $i_{\delta 2}^*$ by the following equation (27).

[Equation 27]

$$i_{\delta 2}^* = T_2/(K_T \hat{\phi}) \quad (27)$$

Figure 6A:
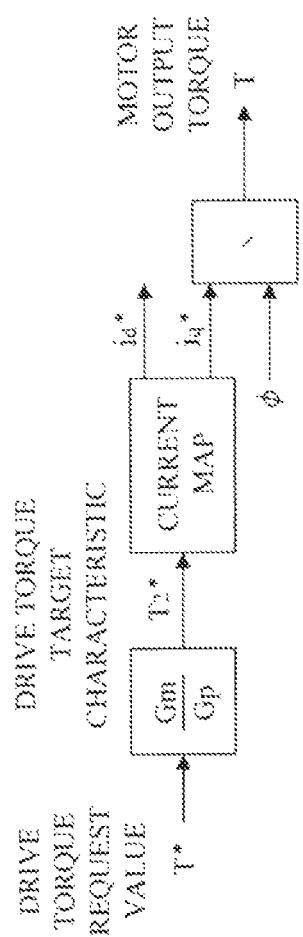
FIG. 6A is a diagram showing control contents in the case of applying the vibration damping filter described in JP2001-45613A to a permanent magnet type synchronous motor.
Figure 6B:
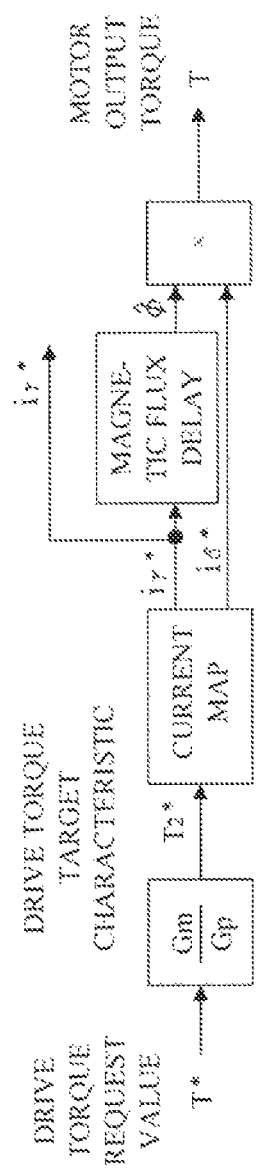
FIG. 6B is a diagram showing control contents in the case of simply applying the vibration damping filter described in JP2001-45613A to an induction motor.
Figure 6C:
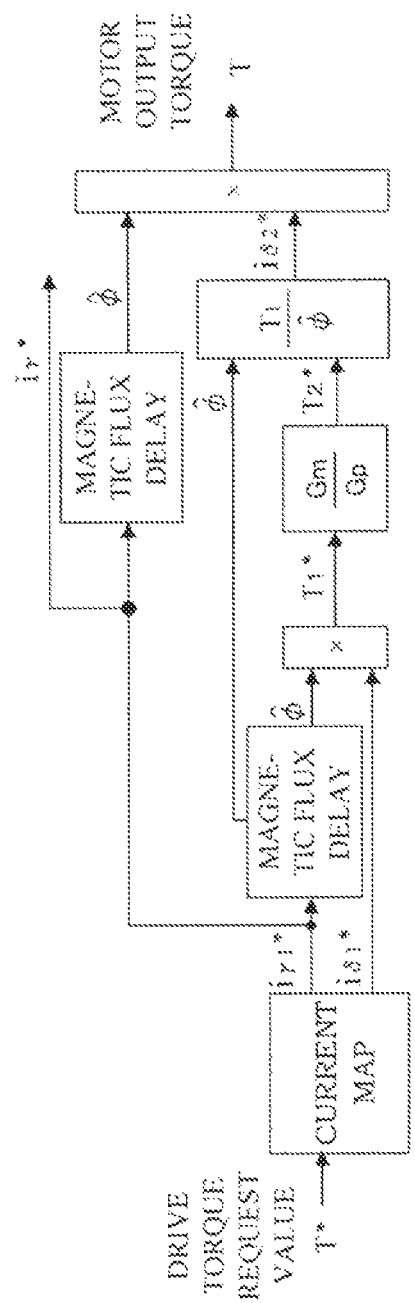
FIG. 6C is a diagram showing control contents of the induction motor control apparatus in the first embodiment.

FIG. 6A is a diagram showing control contents in a case of applying a vibration damping filter (see JP2001-45613A) to a permanent magnet type synchronous motor. FIG. 6B is a diagram showing control contents in the case of simply applying the vibration damping filter described in JP2001-45613A to an induction motor. FIG. 6C is a diagram showing control contents of the induction motor control apparatus in the first embodiment.

As shown in FIG. 6A, in the case of applying the vibration damping filter to the permanent magnet type synchronous motor, a drive torque request value T* is passed through a vibration damping filter $G_m/G_p$ to obtain a drive torque target value $T_2^*$, and a d-axis current command value $i_d^*$ and a q-axis current command value $i_q^*$ are obtained on the basis of the drive torque target value $T_2^*$. In the permanent magnet type synchronous motor, a rotor magnetic flux $\phi$ is constantly generated by a permanent magnet provided in a rotor and an output torque T of the synchronous motor in proportion to the product of the rotor magnetic flux $\phi$, which is a fixed value, and a q-axis current is a linear response and coincides with the above drive torque target value $T_2^*$.

In the case of simply applying the vibration damping filter $G_m/G_p$ to the induction motor, a γ-axis current command value $i_\gamma^*$ and a δ-axis current command value $i_\delta^*$ are obtained on the basis of the drive torque target value $T_2^*$ obtained by causing the drive torque request value T* to pass through the vibration damping filter $G_m/G_p$ as shown in FIG. 6B. Since a rotor magnetic flux delay is caused in the induction motor, the motor output torque T becomes a nonlinear response value and does not coincide with the drive torque request value T* and the torsional vibration of the drive shaft cannot be suppressed.

It should be noted that why the generation delay of the rotor magnetic flux occurs in the induction motor is described here. In the permanent magnet type synchronous motor, the rotor magnetic flux is generated by the permanent magnet provided in the rotor. Since no permanent magnet is provided in the induction motor, the rotor itself does not generate any rotor magnetic flux. Since an induction current is generated in a metal rod of a basket-shaped rotor by a magnetic flux generated by causing a current to flow into a stator and a rotor magnetic flux is thereby generated in the induction motor, the magnetic flux generated in the rotor is delayed with respect to the magnetic flux generated in the stator.

In the induction motor control apparatus in the first embodiment, the γ-axis current command value $i_{\gamma 1}^*$ and the δ-axis current command value $i_{\delta 1}^*$ are obtained on the basis of the drive torque request value T*, and the rotor magnetic flux estimated value $\hat{\phi}$ taking into account the rotor magnetic flux delay is obtained on the basis of the γ-axis current command value $i_{\gamma 1}^*$. Further, the first torque command value $T_1^*$ is obtained on the basis of the rotor magnetic flux estimated value $\hat{\phi}$ and the δ-axis current command value $i_{\delta 1}^*$, and the second torque command value $T_2^*$ is obtained by causing the obtained first torque command value $T_1^*$ to pass through the vibration damping filter $G_m/G_p$. Then, the final δ-axis current command value $i_{\delta 2}^*$ is obtained on the basis of the rotor magnetic flux estimated value $\hat{\phi}$ and the second torque command value $T_2^*$.

Figure 7:
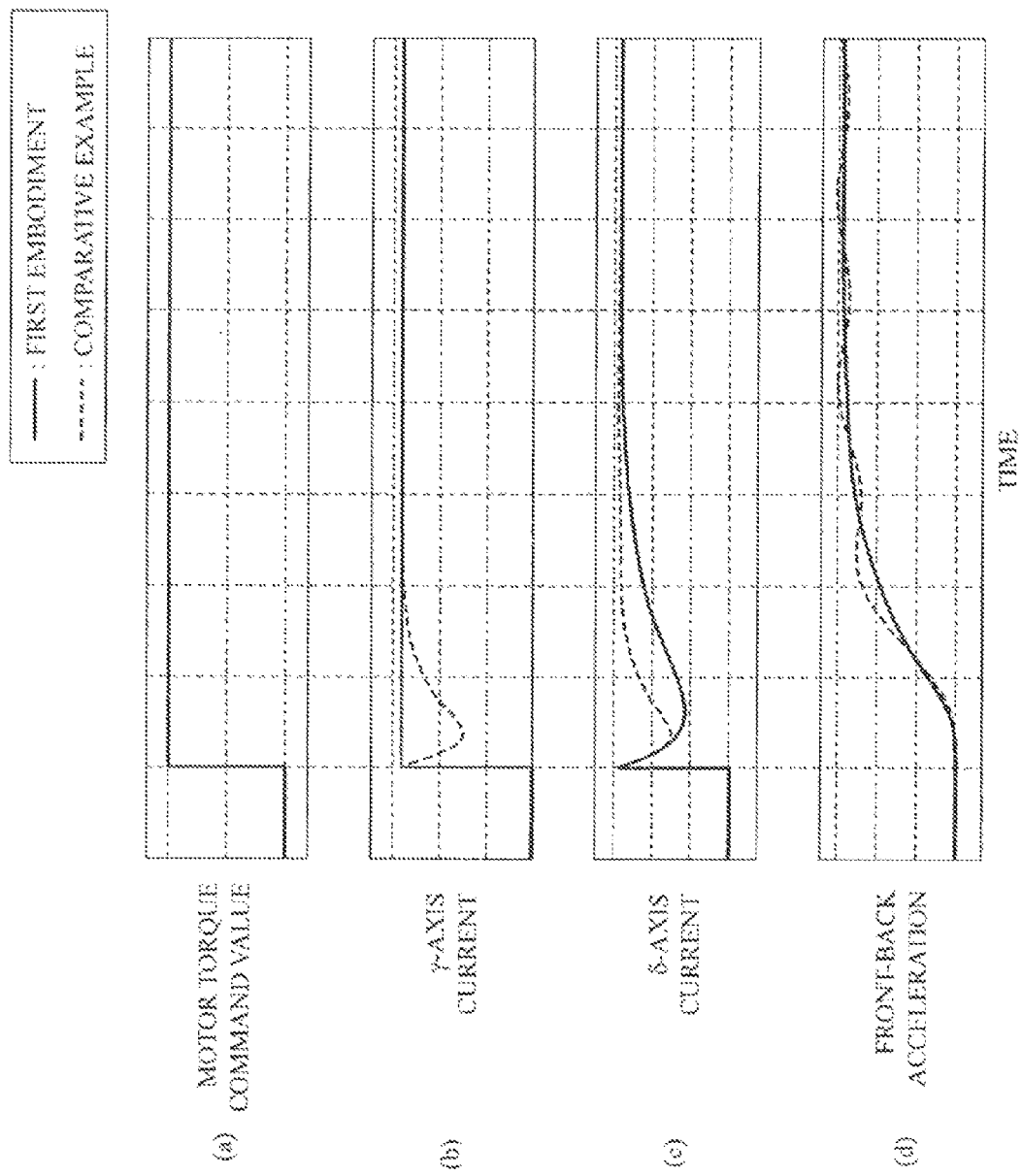
FIG. 7 is a chart showing an example of a control result by the induction motor control apparatus in the first embodiment.

FIG. 7 is a chart showing an example of a control result by the induction motor control apparatus in the first embodiment. (a) to (d) in FIG. 7 respectively show the motor torque command value, the γ-axis current, the δ-axis current and front-back acceleration of the vehicle, wherein a solid line indicates the control result of the present embodiment and a dotted line indicates a control result of a comparative example. The comparative example means a technology of simply applying the vibration damping filter described in JP2001-45613A to an induction motor control system, i.e. a technology of controlling a drive motor on the basis of a drive torque target value obtained by applying the vibration damping filter to a drive torque request value.

Since the drive torque target value and an actual torque do not coincide due to the rotor magnetic flux delay in the comparative example, drive shaft torsional vibration occurs and a front-back acceleration shock of the vehicle (vibration of the front-back acceleration of the vehicle) occurs. Contrary to this, in the induction motor control apparatus in the present embodiment, drive shaft torsional vibration is suppressed by realizing a motor torque for suppressing the drive shaft torsional vibration by the δ-axis current and a shock-free smooth response can be obtained.

As described above, the induction motor control apparatus in the first embodiment sets the motor torque command value $T_m^*$ on the basis of vehicle information, controls the induction motor 1 connected to the drive wheels, calculates the first δ-axis current command value $i_{\delta 1}^*$ and the first γ-axis current command value $i_{\gamma 1}^*$ on the basis of the motor torque command value $T_m^*$ and estimates the rotor magnetic flux on the basis of the first γ-axis current command value $i_{\gamma 1}^*$. Further, the first torque command value $T_1^*$ is calculated on the basis of the rotor magnetic flux estimated value $\hat{\phi}$ and the first δ-axis current command value $i_{\delta 1}^*$, and the second torque command value $T_2^*$ is calculated by applying the filter processing of removing the natural vibration frequency component of the drive shaft torque transmission system of the vehicle to the calculated first torque command value $T_1^*$. Then, the second δ-axis current command value $i_{δ2}^*$ is calculated on the basis of the second torque command value $T_2^*$ and the rotor magnetic flux estimated value $\hat{φ}$, and the drive of the motor is controlled on the basis of the first γ-axis current command value $i_{γ1}^*$ and the second δ-axis current command value $i_{δ2}^*$. A feature will be briefly described. The nonlinear second torque command value $T_2^*$ is calculated by applying the filter processing of removing the natural vibration frequency component of the drive shaft torque transmission system of the vehicle to the first torque command value $T_1^*$ calculated on the basis of the rotor magnetic flux estimated value $\hat{φ}$ and the first δ-axis current command value $i_{δ1}^*$, and the drive of the induction motor is controlled on the basis of the second δ-axis current command value $i_{δ2}^*$ calculated on the basis of the second torque command value $T_2^*$ and the rotor magnetic flux estimated value $\hat{φ}$ and the first γ-axis current command value $i_{γ1}^*$. In this way, the torsional vibration of the drive shaft of the vehicle can be suppressed without being affected by the rotor magnetic flux delay unique to the induction motor.

Particularly, since the second δ-axis current command value $i_{δ2}^*$ is calculated by dividing the second torque command value $T_2^*$ obtained by removing the natural vibration frequency component of the drive shaft torque transmission system of the vehicle by the rotor magnetic flux estimated value $\hat{φ}$, a phase shift of the actual torque due to the nonlinearity of the torque response can be prevented and the torsional vibration of the drive shaft can be suppressed.

Further, since the rotor magnetic flux is estimated on the basis of the transmission characteristic in which the response of the γ-axis current value to the γ-axis current command value is simulated and the transmission characteristic in which the response of the rotor magnetic flux to the γ-axis current is simulated, the rotor magnetic flux estimated value can be calculated by the filtering processing.

Second Embodiment

When a current response is sufficiently faster than a rotor magnetic flux response, current response estimation/calculation processing performed in the magnetic flux estimator 23 can be omitted.

Figure 8:
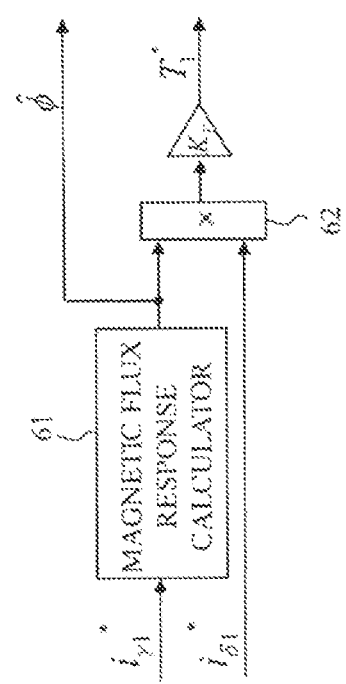
FIG. 8 is a block diagram showing a detailed configuration of a magnetic flux estimator in a second embodiment.

FIG. 8 is a block diagram showing a detailed configuration of a magnetic flux estimator 23 in a second embodiment. The magnetic flux estimator 23 of the second embodiment includes a magnetic flux response calculator 61 and a multiplier 62 and calculates a first torque command value $T_1^*$ and a rotor magnetic flux estimated value $\hat{φ}$ by the following equations (28), (29). $K_T$ denotes a coefficient determined by parameters of an induction motor and $τ_φ$ denotes a time constant of a rotor magnetic flux response.

[Equation 28]

$$T_1^* = K_T \hat{φ} \cdot i_{δ1}^* \quad (28)$$

[Equation 29]

$$\hat{φ} = \frac{M}{τ_φ * s + 1} \cdot i_{γ1}^* \quad (29)$$

As described above, also in an induction motor control apparatus in the second embodiment, the torsional vibration of a drive shaft of a vehicle can be suppressed without being affected by a rotor magnetic flux delay unique to the induction motor similarly to the induction motor control apparatus in the first embodiment. Further, since the rotor magnetic flux is estimated on the basis of a transmission characteristic in which a response of the rotor magnetic flux to a γ-axis current is simulated, the rotor magnetic flux estimated value can be obtained by filtering processing.

Third Embodiment

When an induction motor generates a torque in a state of zero rotor magnetic flux, a response delay of torque generation occurs due to a delay of a rotor magnetic flux response. In an induction motor control apparatus of a third embodiment, a fixed amount of the rotor magnetic flux is generated in advance before a motor torque command value is input.

Figure 9:
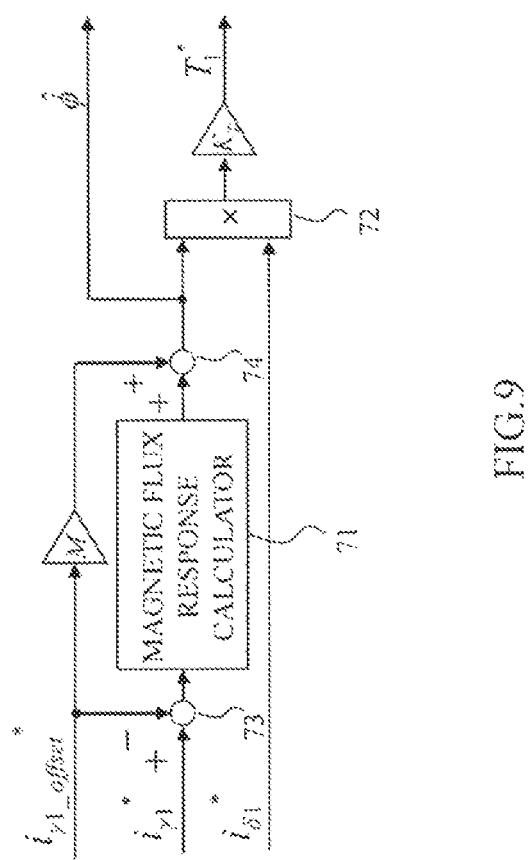
FIG. 9 is a block diagram showing a detailed configuration of a magnetic flux estimator in a third embodiment.

FIG. 9 is a block diagram showing a detailed configuration of a magnetic flux estimator 23 in a third embodiment. The magnetic flux estimator 23 of the third embodiment includes a magnetic flux response calculator 71, a multiplier 72, a subtractor 73 and an adder 74 and calculates a first torque command value $T_1^*$ and a rotor magnetic flux estimated value $\hat{φ}$ by the following equations (30), (31). $K_T$ denotes a coefficient determined by parameters of an induction motor and $τ_φ$ denotes a time constant of a rotor magnetic flux response. Further, $i_{γ1\_offset}$ denotes a γ-axis current offset value input in advance.

[Equation 30]

$$T_1^* = K_T \hat{φ} \cdot i_{δ1}^* \quad (30)$$

[Equation 31]

$$\hat{φ} = \frac{M}{τ_φ \cdot s + 1} \cdot (i_{γ1}^* - i_{γ1\_offset}) + M \cdot i_{γ1\_offset} \quad (31)$$

Figure 10:
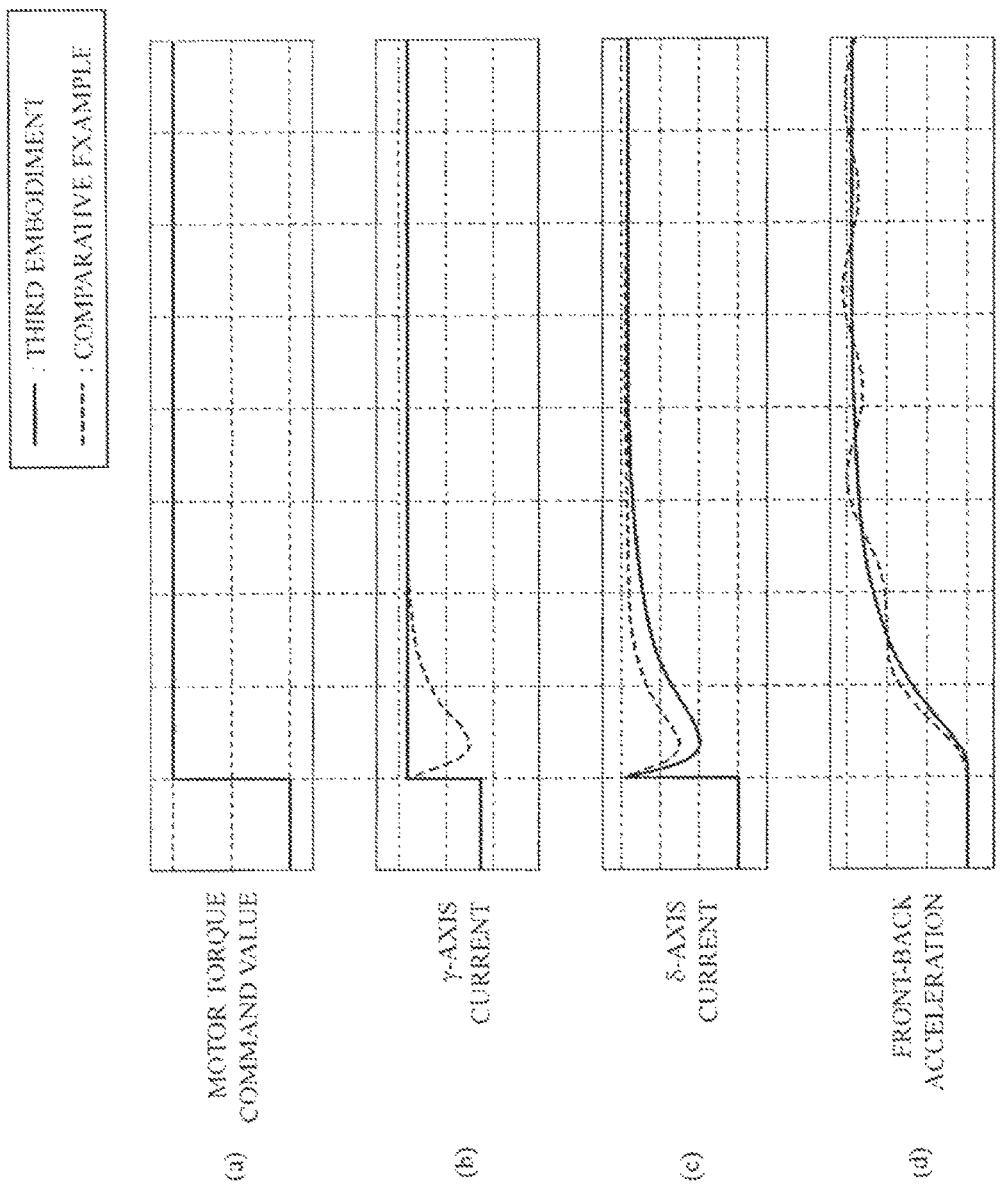
FIG. 10 is a chart showing an example of a control result by an induction motor control apparatus in the third embodiment.

FIG. 10 is a chart showing an example of a control result by the induction motor control apparatus in the third embodiment. (a) to (d) in FIG. 10 respectively show a motor torque command value, a γ-axis current, a δ-axis current and front-back acceleration, wherein a solid line indicates the control result of the present embodiment and a dotted line indicates a control result of a comparative example.

Since a fixed amount of the γ-axis current $i_{γ1\_offset}$ is caused to flow in advance before the motor torque command value is input in the present embodiment, a shock-free smooth high response can be obtained by suppressing drive shaft torsional vibration while improving a torque response.

As described above, since the induction motor control apparatus in the third embodiment can generate the fixed amount of the rotor magnetic flux in advance before the motor torque command value is input, drive shaft torsional vibration can be suppressed while the response of the motor torque is improved.

Fourth Embodiment

How to remove a natural vibration frequency component of a drive shaft torque transmission system of a vehicle in consideration of the influence of gear backlash even in such a traveling scene where the vehicle is accelerated from a coasting or a decelerating state will be explained.

Figure 11:
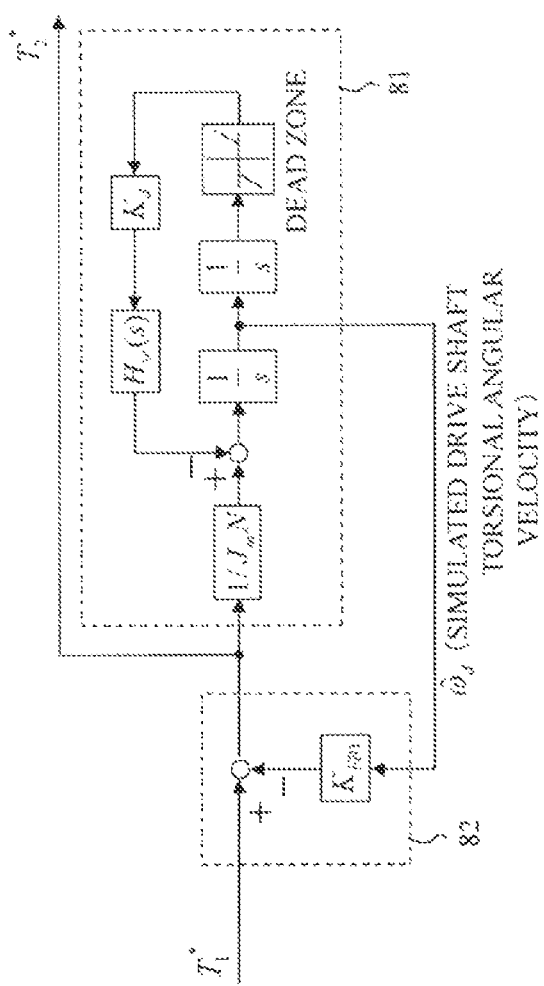
FIG. 11 is a block diagram showing a detailed configuration of a torque target value calculator in a fourth embodiment.

FIG. 11 is a block diagram showing a detailed configuration of a torque target value calculator 24 in a fourth embodiment. The torque target value calculator 24 includes a vehicle model 81 configured by vehicle parameters and a dead zone model simulating gear backlash, and a drive shaft torsional angular velocity F/B model 82 for subtracting a value obtained by multiplying a simulated drive shaft torsional angular velocity by an F/B gain $K_{FB1}$ from a first torque command value $T_1^*$. A deviation between the first torque command value $T_1^*$ and the value obtained by multiplying the simulated drive shaft torsional angular velocity $\hat{\omega}_d$ by the F/B gain $K_{FB1}$ is set as a second torque command value $T_2^*$.

Processing performed in the vehicle model 81 will be described.

When a transmission characteristic from a motor torque command value $T_m$ to a drive shaft torque $T_d$ is obtained by Laplace-transforming the equations (16) to (20), the transmission characteristic is expressed by the following equations (32).

[Equations 32]

$$\frac{T_d}{T_m} = \frac{c_1 s + c_0}{a_3 s^3 + a_2 s^2 + a_1 s + a_0} \quad (32)$$

$$c_1 = 2 K_d J_w M / N$$

$$c_0 = K_d K_t (2 J_w + r^2 M) / N$$

When a transmission characteristic from a motor angular velocity $\omega_m$ to a drive shaft angular velocity $\omega_w$ is obtained by the equations (17), (19) and (20), the transmission characteristic is expressed by the following equation (33).

[Equation 33]

$$\frac{\omega_w}{\omega_m} = \frac{b_1 s + b_0}{b_3 s^3 + b_2 s^2 + b_1 s + b_0} \cdot \frac{1}{N} \quad (33)$$

From the equations (21), (22) and (33), a transmission characteristic from the motor torque command value $T_m$ to the drive shaft angular velocity $\omega_w$ is expressed by the following equation (34).

[Equation 34]

$$\frac{\omega_w}{T_m} = \frac{1}{N} \cdot \frac{1}{s} \cdot \frac{b_1 s + b_0}{a_3 s^3 + a_2 s^2 + a_1 s + a_0} \quad (34)$$

From the equations (32), (34), a transmission characteristic from the drive shaft torque $T_d$ to the drive shaft angular velocity $\omega_w$ is expressed by the following equation (35).

[Equation 35]

$$\omega_w = \frac{1}{N} \cdot \frac{1}{s} \cdot \frac{b_1 s + b_0}{c_1 s + c_0} T_d \quad (35)$$

By modifying the equation (16), the following equation (36) can be obtained.

[Equation 36]

$$\frac{\omega_m}{N} = \frac{1}{J_m N s} T_m - \frac{1}{J_m N^2 s} T_d \quad (36)$$

From the equations (35), (36), a drive shaft torsional angular velocity $\omega_m/N - \omega_w$ is expressed by the following equation (37).

[Equation 37]

$$\frac{\omega_m}{N} - \omega_w = \frac{1}{J_m N s} T_m - \frac{1}{J_m N^2 s} T_d - \frac{1}{N} \cdot \frac{1}{s} \cdot \frac{b_1 s + b_0}{c_1 s + c_0} T_d \quad (37)$$

$$= \frac{1}{s} \cdot \left( \frac{T_m}{J_m H} - H_w(s) \cdot T_d \right)$$

$H_w(s)$ in the equation (37) is expressed by the following equations (38).

[Equations 38]

$$H_w(s) = \frac{v_1 s + v_0}{w_1 s + w_0} \quad (38)$$

$$v_1 = J_m N b_1 + c_1 = 2 J_w M N (J_m + K_d / N^2)$$

$$v_0 = J_m N b_0 + c_0 = K_d K_i (2 J_w N^2 + 2 J_w + r^2 M) / N$$

$$w_1 = J_m N^2 c_1 = 2 K_d J_m J_w M N$$

$$w_0 = J_m N^2 c_0 = K_d K_i J_m (2 J_w + r^2 M) N$$

Further, when a backlash characteristic from the motor to the drive shaft is modeled in the dead zone, the drive shaft torque $T_d$ is expressed by the following equation (39).

[Equation 39]

$$T_d = \begin{cases} K_d (\theta - \theta_d / 2) & (\theta \geq \theta_d / 2) \\ 0 & (-\theta_d / 2 < \theta < \theta_d / 2) \\ K_d (\theta + \theta_d / 2) & (\theta \leq -\theta_d / 2) \end{cases} \quad (39)$$

Here, $\theta_d$ denotes an overall backlash amount from the motor to the drive shaft.

Next, the drive shaft torsional angular velocity F/B model 82 is explained.

When a drive shaft torsional angular velocity F/B command value $T_{FB}$ is expressed by the following equation (40) using the simulated drive shaft torsional angular velocity $\hat{\omega}_d = \omega_m/N - \omega_w$ calculated by the vehicle model 81, the equation (40) can be rewritten into equation (41) from the equation (19).

[Equation 40]

$$T_{FB} = K_{FB1} \cdot (\omega_m / N - \omega_x) \quad (40)$$

[Equation 41]

$$T_{FB} = \frac{K_{FB1} s}{K_d} \cdot T_d \quad (41)$$

Further, the equation (32) can be modified into the following equation (42). $\zeta_p$ and $\omega_p$ respectively denote a damping coefficient and a natural vibration frequency of a drive torque transmission system.

[Equation 42]

$$\frac{T_d}{T_m} = \frac{c_1 s + c_0}{a_3 s^3 + a_2 s^2 + a_1 s + a_0} = \frac{c_1}{a_3} \cdot \frac{s + c_0/c_1}{(s+\alpha)(s^2 + 2\zeta_p \omega_p s + \omega_p^2)} \quad (42)$$

When a pole and a zero point of the equation (42) are checked, $\alpha \fallingdotseq c_0/c_1$ in a regular vehicle. Thus, when pole-zero cancellation is carried out, the following equation (43) is obtained.

[Equation 43]

$$T_d = \frac{g_t}{s^2 + 2\zeta_p \omega_p s + \omega_p^2} T_m \quad (43)$$

$$g_t = c_0/(a_3 \cdot \alpha)$$

In the case of subtracting the drive shaft torsional angular velocity F/B command value $T_{FB}$ from the motor torque command value $T_m$ by the equations (41) and (43), the drive shaft torque $T_d$ is expressed by the following equation (44).

[Equation 44]

$$T_d = \frac{g_t}{s^2 + 2\zeta_p \omega_p s + \omega_p^2}(T_m - T_{PB}) \quad (44)$$

$$= \frac{g_t}{s^2 + 2\zeta_p \omega_p s + \omega_p^2}\left(T_m - \frac{K_{FB1}s}{K_d} \cdot T_d\right)$$

When the equation (44) is modified, a transmission characteristic of the drive shaft torsional angular velocity F/B system is expressed by the following equation (45).

[Equation 45]

$$T_d = \frac{g_t}{s^2 + (2\zeta_p \omega_p + g_t K_{FB1}/K_d)s + \omega_p^2} T_m \quad (45)$$

When a model response is expressed by the following equation (46), a condition on which the model response coincides with the transmission characteristic of the drive shaft torsional angular velocity F/B system is expressed by the following equation (47).

[Equation 46]

$$T_d = \frac{g_t}{s^2 + 2\omega_p s + \omega_p^2} T_m \quad (46)$$

[Equation 47]

$$2\zeta_p \omega_p + g_t K_{FB1}/K_d = 2\omega_p \quad (47)$$

From the equation (47), the F/B gain $K_{FB1}$ is expressed by the following equation (48).

[Equation 48]

$$K_{FB1} = 2(1-\zeta_p)\omega_p K_d/g_t \quad (48)$$

Figure 12:
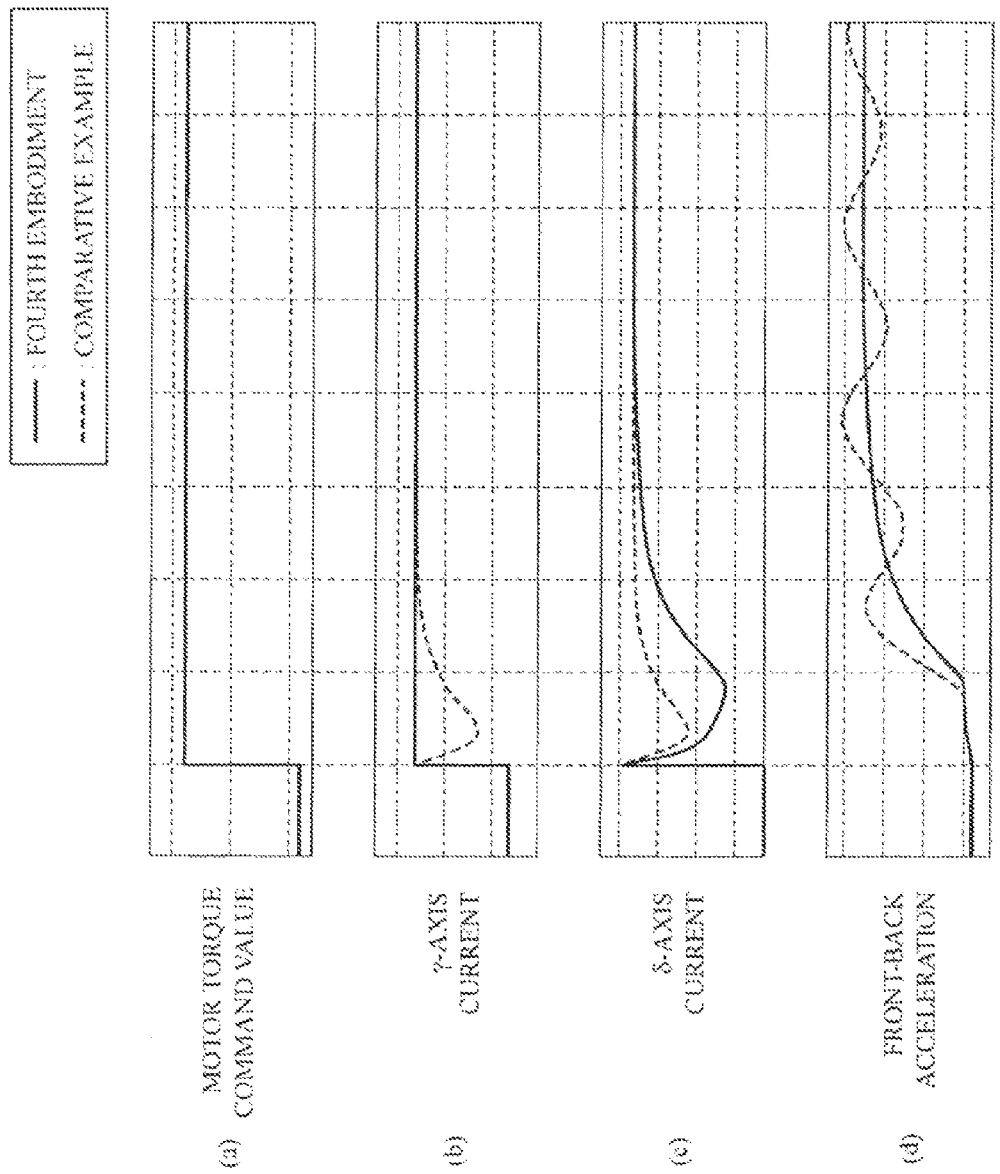
FIG. 12 is a chart showing an example of a control result by an induction motor control apparatus in the fourth embodiment.

FIG. 12 is chart showing an example of a control result by an induction motor control apparatus in the fourth embodiment. (a) to (d) in FIG. 12 respectively show a motor torque command value, a γ-axis current, a δ-axis current and front-back acceleration, wherein a solid line indicates the control result of the present embodiment and a dotted line indicates a control result of a comparative example.

In the comparative example, large drive shaft torsional vibration occurs due to gear backlash and the vibration of the front-back acceleration of the vehicle occurs in such a scene where the vehicle is accelerated from a coasting state. Contrary to this, in the present embodiment, a motor torque taking into account the gear backlash can be generated and a shock-free smooth response can be obtained.

The present invention is not limited to the aforementioned embodiments and various modifications and applications are possible.

The present application claims priority based on Japanese Patent Application No. 2013-012535 filed at the Japan Patent Office on Jan. 25, 2013, the entire contents of which are incorporated by reference herein.

The invention claimed is:

1. An induction motor control apparatus for controlling an induction motor connected to drive wheels by setting a motor torque command value on the basis of vehicle information, the induction motor control apparatus comprising:
   a current command value calculating unit of a vibration damping control calculator configured to calculate a first torque current command value and a first excitation current command value on the basis of the motor torque command value;
   a rotor magnetic flux estimating unit of the vibration damping control calculator configured to estimate a rotor magnetic flux on the basis of the first excitation current command value;
   a first torque command value calculating unit of the vibration damping control calculator configured to calculate a first torque command value on the basis of an estimated value of the rotor magnetic flux and the first torque current command value;
   a second torque command value calculating unit of the vibration damping control calculator configured to calculate a nonlinear second torque command value by applying filter processing to the first torque command value, a natural vibration frequency component of a drive shaft torque transmission system in a vehicle being removed in the filter processing;
   a torque current command value calculating unit of the vibration damping control calculator configured to calculate a second torque current command value on the basis of the second torque command value and the estimated value of the rotor magnetic flux; and
   a control unit configured to control drive of the induction motor on the basis of the first excitation current command value and the second torque current command value.

2. The induction motor control apparatus according to claim 1, wherein:
   the torque current command value calculating unit calculates the second torque current command value by dividing the second torque command value by the estimated value of the rotor magnetic flux.

3. The induction motor control apparatus according to claim 1, wherein:
   the rotor magnetic flux estimating unit estimates the rotor magnetic flux on the basis of a transmission characteristic in which a response of the rotor magnetic flux to an excitation current is simulated.

4. The induction motor control apparatus according to claim 1, wherein:

the rotor magnetic flux estimating unit estimates the rotor magnetic flux on the basis of a transmission characteristic in which a response of an excitation current value to an excitation current command value is simulated and a transmission characteristic in which a response of the rotor magnetic flux to the excitation current is simulated.

5. An induction motor control method of controlling, by an induction motor control apparatus including a vibration damping control calculator, an induction motor connected to drive wheels by setting a motor torque command value on the basis of vehicle information, the induction motor control method comprising:

calculating, by a current command value calculating unit of the vibration damping control calculator, a first torque current command value and a first excitation current command value on the basis of the motor torque command value;

estimating, by a rotor magnetic flux estimating unit of the vibration damping control calculator, a rotor magnetic flux on the basis of the first excitation current command value;

calculating, by a first torque command value calculating unit of the vibration damping control calculator, a first torque command value on the basis of an estimated value of the rotor magnetic flux and the first torque current command value;

calculating, by a second torque command value calculating unit of the vibration damping control calculator, a nonlinear second torque command value by applying filter processing to the first torque command value, a natural vibration frequency component of a drive shaft torque transmission system in a vehicle being removed in the filter processing;

calculating, by a torque current command value calculating unit of the vibration damping control calculator, a second torque current command value on the basis of the second torque command value and the estimated value of the rotor magnetic flux; and controlling, by a control unit of the induction motor control apparatus, drive of the induction motor on the basis of the first excitation current command value and the second torque current command value.

* * * * *